(12) United States Patent
Hsu et al.

(10) Patent No.: US 11,750,924 B2
(45) Date of Patent: Sep. 5, 2023

(54) CAMERA WITH SENSOR-SHIFTING AUTOFOCUS MECHANISM

(71) Applicant: Apple Inc., Cupertino, CA (US)

(72) Inventors: Ya-Wen Hsu, San Francisco, CA (US); Hua Deng, Cupertino, CA (US); Raymond A. Quines, Cupertino, CA (US); Yu Min Lee, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/483,709

(22) Filed: Sep. 23, 2021

(65) Prior Publication Data

US 2022/0103744 A1 Mar. 31, 2022

Related U.S. Application Data (60) Provisional application No. 63/083,626, filed on Sep. 25, 2020.

(51) Int. Cl.
*H04N 23/67* (2023.01)
*G02B 7/02* (2021.01)
(Continued)

(52) U.S. Cl.
CPC .............. *H04N 23/67* (2023.01); *G02B 7/02* (2013.01); *H04N 23/54* (2023.01); *H04N 23/55* (2023.01)

(58) Field of Classification Search
CPC ............. H04N 5/23212; H04N 5/2253; H04N 5/2254; H04N 5/335; G02B 7/02;
(Continued)

(56) References Cited

U.S. PATENT DOCUMENTS 10,365,121 B2 7/2019 Wong et al.
2017/0094182 A1* 3/2017 Miller ...................... G02B 7/09
(Continued)

FOREIGN PATENT DOCUMENTS

AU 2019200955 2/2019
AU 2019100453 8/2019
(Continued)

OTHER PUBLICATIONS

International Search Report and Written Opinion from PCT/US2021/052059, dated Jan. 18, 2022, pp. 1-12.

*Primary Examiner* — Padma Haliyur
(74) *Attorney, Agent, or Firm* — Robert C. Kowert; Kowert, Hood, Munyon, Rankin & Goetzel, P.C.

(57) ABSTRACT

Various embodiments include a camera having a sensor-shifting mechanism. For example, the camera may include a voice coil motor (VCM) actuator to move an image sensor, relative to a lens group, to provide autofocus (AF) functionality. According to some embodiments, the VCM actuator may include one or more coils attached to a coil carrier, and one or more magnets attached to a stationary structure of the camera. The coil carrier may be attached to an image sensor package such that the image sensor is movable together with the coil carrier, in at least one direction parallel to an optical axis defined by the lens group. In some embodiments, the camera may include one or more suspension arrangements to suspend the coil carrier and/or the image sensor package from one or more stationary structures of the camera.

20 Claims, 9 Drawing Sheets

(51) Int. Cl.
*H04N 23/54* (2023.01)
*H04N 23/55* (2023.01)

(58) Field of Classification Search
CPC .. G02B 7/09; G03B 2205/0069; G03B 13/36; G03B 30/00; G03B 3/10
See application file for complete search history.

(56) References Cited

U.S. PATENT DOCUMENTS

| | | | |
|---|---|---|---|
| 2018/0041668 A1* | 2/2018 | Cui | H04N 23/51 |
| 2018/0059381 A1 | 3/2018 | Sharma et al. | |
| 2019/0020822 A1 | 1/2019 | Sharma et al. | |
| 2019/0141248 A1* | 5/2019 | Hubert | H04N 5/23287 |
| 2019/0235202 A1* | 8/2019 | Smyth | H04N 5/2257 |
| 2019/0364217 A1* | 11/2019 | Sharma | H04N 5/2253 |

FOREIGN PATENT DOCUMENTS

| | | |
|---|---|---|
| WO | 2014100516 | 6/2014 |
| WO | 2018057986 | 3/2018 |

\* cited by examiner

CAMERA WITH SENSOR-SHIFTING AUTOFOCUS MECHANISM

This application claims benefit of priority to U.S. Provisional Application Ser. No. 63/083,626, entitled "Camera with Sensor-Shifting Autofocus Mechanism," filed Sep. 25, 2020, and which is hereby incorporated herein by reference in its entirety.

BACKGROUND

Technical Field

This disclosure relates generally to architecture for a camera that includes a sensor-shifting autofocus (AF) mechanism.

Description of the Related Art

The advent of small, mobile multipurpose devices such as smartphones and tablet or pad devices has resulted in a need for high-resolution, small form factor cameras for integration in the devices. Some small form factor cameras may incorporate optical image stabilization (OIS) mechanisms that may sense and react to external excitation/disturbance by adjusting location of the optical lens on the X and/or Y axis in an attempt to compensate for unwanted motion of the lens. Some small form factor cameras may incorporate an autofocus (AF) mechanism whereby the object focal distance can be adjusted to focus an object plane in front of the camera at an image plane to be captured by the image sensor. In some such autofocus mechanisms, the optical lens is moved as a single rigid body along the optical axis of the camera to refocus the camera.

BRIEF DESCRIPTION OF THE DRAWINGS

FIGS. 1A-1D illustrate views of an example camera having a sensor-shifting autofocus (AF) mechanism, in accordance with some embodiments.

FIGS. 3A-3B illustrate views of an example magnet-coil arrangement of a voice coil motor (VCM) actuator that may be included in a camera having a sensor-shifting AF mechanism, in accordance with some embodiments.

FIGS. 4A-4B illustrate examples of AF motion that may be implemented in a camera having a sensor-shifting AF mechanism, in accordance with some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

DETAILED DESCRIPTION

Various embodiments include a camera having a sensor-shifting mechanism. For example, the camera may include a voice coil motor (VCM) actuator to move an image sensor, relative to a lens group, to provide autofocus (AF) functionality. According to some embodiments, the VCM actuator may include one or more coils attached to a coil carrier, and one or more magnets attached to a stationary structure of the camera. The coil carrier may be attached to an image sensor package such that the image sensor is movable together with the coil carrier, in at least one direction parallel to an optical axis defined by the lens group. In some embodiments, the camera may include one or more suspension arrangements to suspend the coil carrier and/or the image sensor package from one or more stationary structures of the camera.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

Figure 1A:
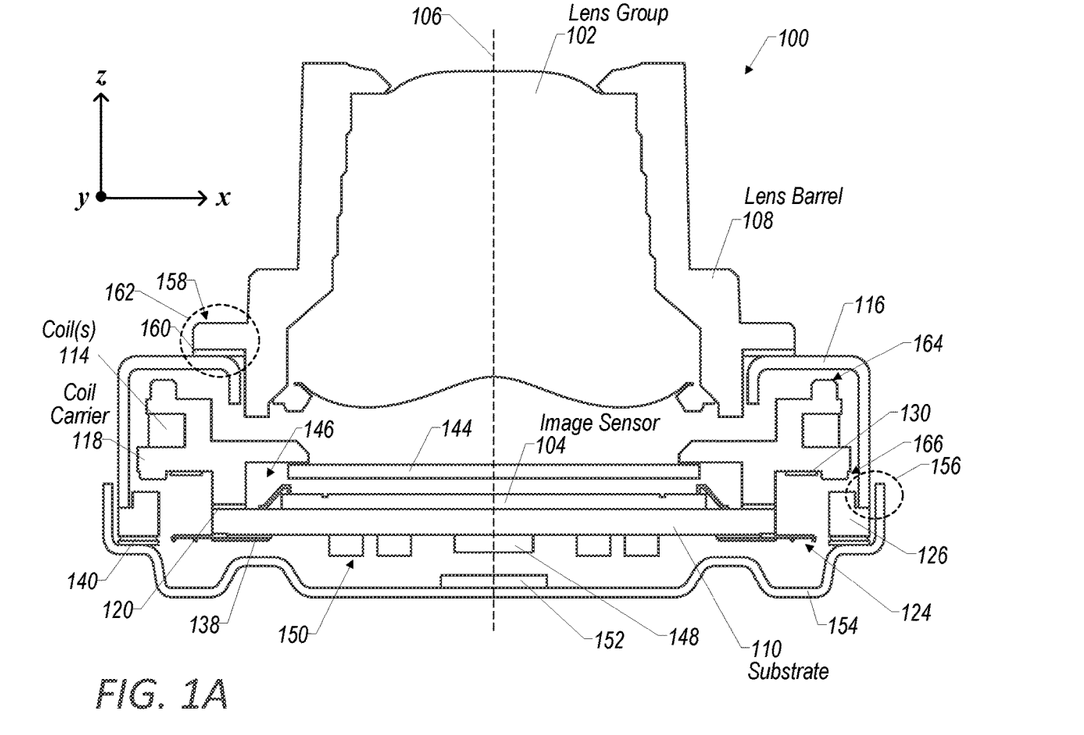
FIG. 1A shows a side cross-sectional view of the camera.
Figure 1B:
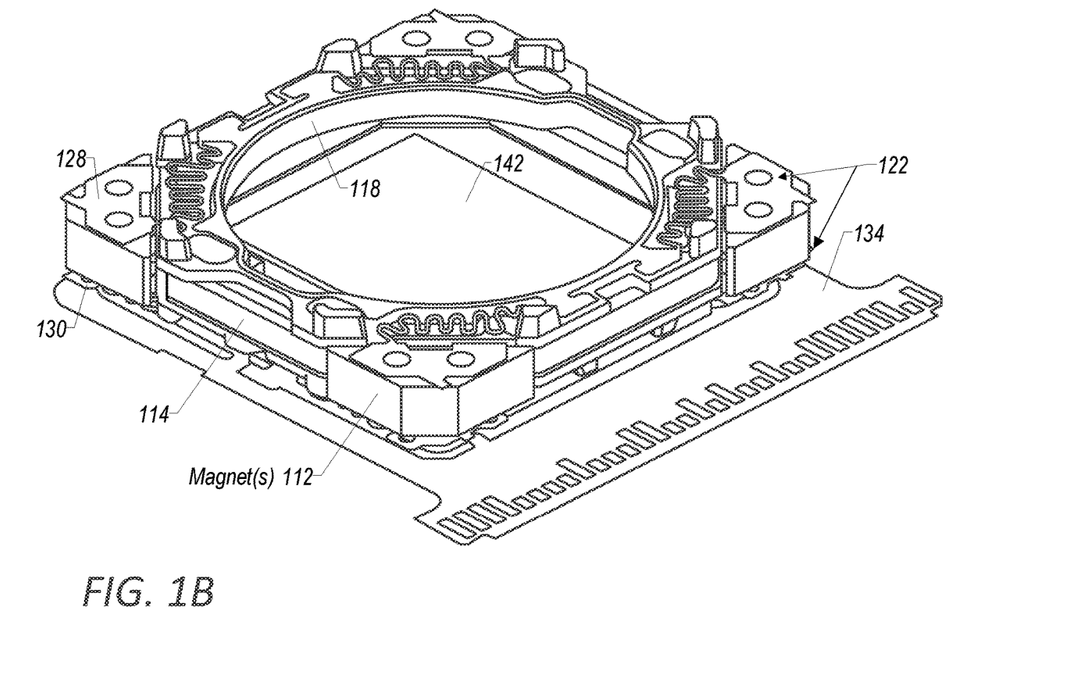
FIG. 1B shows a perspective view that includes some suspension and actuator components of the camera.
Figure 1C:
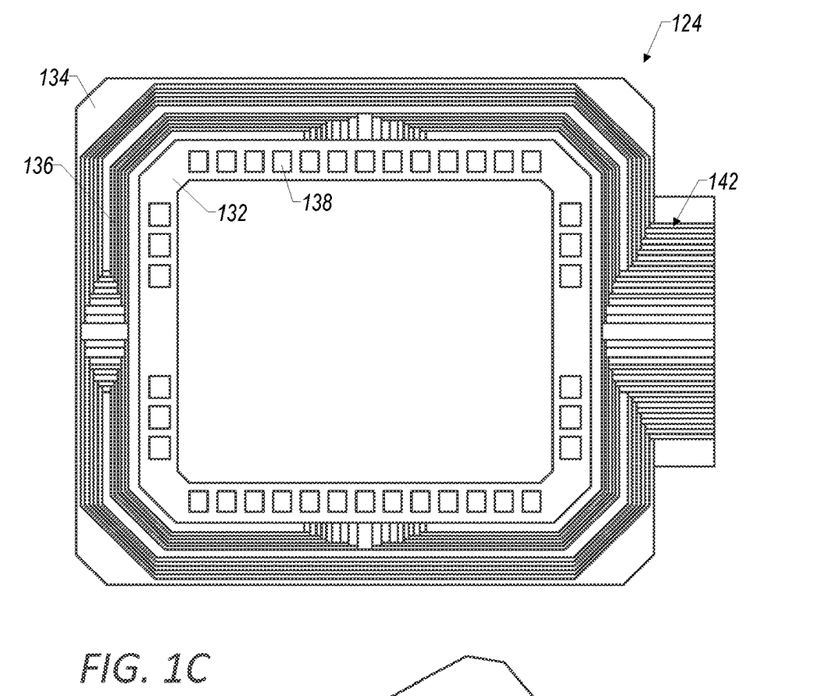
FIG. 1C shows a top view of an example flexure arrangement that may be included in the camera.
Figure 1D:
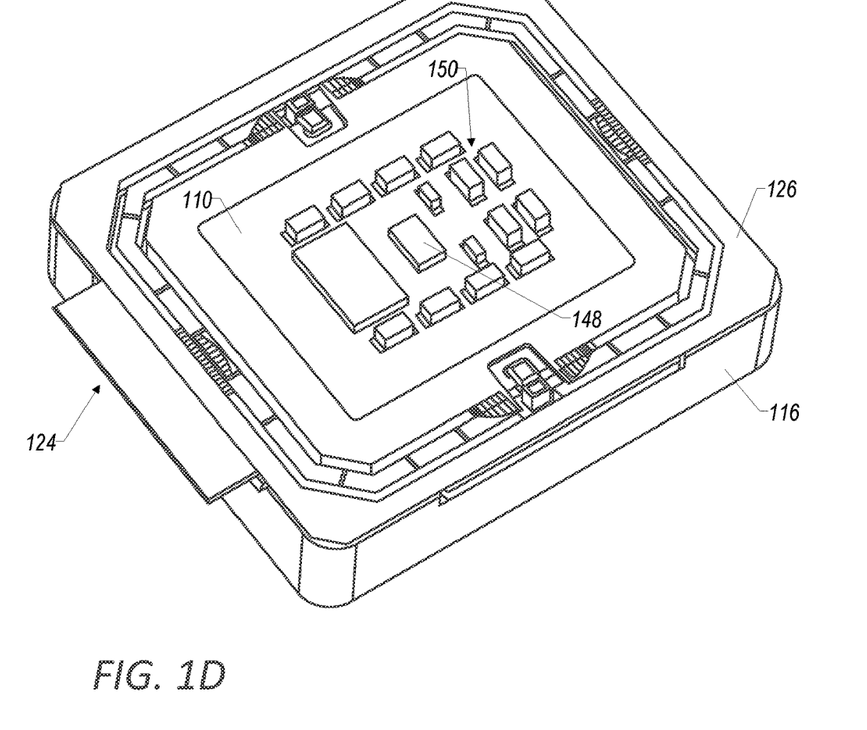
FIG. 1D shows a bottom perspective view that includes some external components and some electrical components mounted on an underside of a substrate that may be included in the camera.

FIGS. 1A-1D illustrate views of an example camera 100 having a sensor-shifting autofocus (AF) mechanism. FIG. 1A shows a side cross-sectional view of the camera 100. FIG. 1B shows a perspective view that includes some suspension and actuator components of the camera 100. FIG. 1C shows a top view of an example flexure arrangement that may be included in the camera 100. FIG. 1D shows a bottom perspective view that includes some external components and some electrical components mounted on an underside of a substrate that may be included in the camera 100. The example X-Y-Z coordinate system shown in FIG. 1A may apply to embodiments discussed throughout this disclosure.

In various embodiments, the camera 100 may include a lens group 102, an image sensor 104, and the sensor-shifting AF mechanism (which may be used to move the image sensor 104 relative to the lens group 102). The lens group 102 may include one or more optical elements that define an optical axis 106. The lens group 102 may be fixedly coupled with a lens barrel 108. For example, the lens group 102 may be contained within the lens barrel 108, as indicated in FIG. 1A. The image sensor 104 may be configured to capture image data based on light that passes through the lens group 102. The image sensor 104 may be fixedly coupled with a substrate 110, e.g., such that the image sensor 104 is movable together with the substrate 110. According to various embodiments, the image sensor 104, the substrate 110, and/or one or more other components may be included in an image sensor package.

In some embodiments, the sensor-shifting AF mechanism may include a voice coil motor (VCM) actuator and one or more suspension arrangements. The VCM actuator may include one or more magnets 112 and one or more coils 114. The magnet(s) 112 may be attached to a stationary structure of the camera 100. For example, the magnet(s) 112 may be attached to a yoke 116 that at least partially encases the VCM actuator. In some embodiments, the yoke 116 may serve as both a magnet holder and an enclosure (e.g., a shield can). The magnet(s) 112 may comprise corner magnet(s) in some non-limiting embodiments. For example, as indicated in FIG. 1B, the magnet(s) 112 may be four corner magnets. The corner magnets may be mounted at corners of the yoke 116 (which may also correspond to corners of the camera 100). In various embodiments, the coil(s) 114 may be attached to a coil carrier 118 that is fixedly coupled with the image sensor package. The coil carrier 118 may be attached to the substrate 110 (e.g., via an adhesive at bond line 120 in FIG. 1A). According to various embodiments, the coil(s) 114 may be positioned proximate the magnet(s) 112, such that the coil(s) 114 are capable of electromagnetically interacting with the magnet(s) 112 to produce Lorentz forces that move the image sensor in at least one direction parallel to the optical axis 106 (e.g., in the Z-axis direction), as also discussed herein with reference to FIGS. 3A-4B.

In various embodiments, the suspension arrangement(s) may include a spring suspension arrangement 122 and/or a flexure arrangement 124. For example, the spring suspension arrangement 122 may be configured to suspend the coil carrier 118 from one or more stationary structures of the camera 100, such as the magnet(s) 112, the yoke 116, and/or a base structure 126. Furthermore, the spring suspension arrangement 122 may be configured to allow motion of the coil carrier 118 enabled by the VCM actuator. In some examples, the spring suspension arrangement 122 may include an upper leaf spring 128 and/or a lower leaf spring 130, as indicated in FIGS. 1A-1B. The upper leaf spring 128 may be attached to the coil carrier 118 and to the magnet(s) 112 (and/or to the yoke 116). The lower leaf spring 130 may be attached to the coil carrier 118 and to the magnet(s) 112 (and/or to the base structure 126).

In some embodiments, the flexure arrangement 124 may be used for suspension and/or for routing electrical signals. As indicated in FIG. 1C, the flexure arrangement 124 may include an inner platform 132, an outer platform 134, and one or more flexure arms 136. The inner platform 132 may be connected to the substrate 110, e.g., via electrical connections 138. The outer platform 134 may be connected to the base structure 126 (e.g., via an adhesive at bond line 140 in FIG. 1A). The flexure arm(s) 136 may be connected to the inner platform 132 and to the outer platform 134. In some embodiments, the flexure arm(s) 136 may have sufficient stiffness to provide at least some support in the suspension functions of the suspension arrangement(s). Furthermore, the flexure arm(s) 136 may have sufficient compliance in at least the Z-axis direction, to allow motion enabled by the VCM actuator. In some embodiments, the flexure arm(s) 136 may have sufficient in-plane stiffness (e.g., in the X-Y plane) so as to limit undesired motion in directions orthogonal to the optical axis 106. However, it should be understood that in some embodiments the flexure arrangement 124 may be designed to allow controlled motion in directions orthogonal to the optical axis 106, e.g., in an embodiment of the camera 100 that includes a sensor-shifting optical image stabilization (OIS) mechanism.

According to various embodiments, the flexure arrangement 124 may include one or more electrical traces 140 for routing electrical signals (e.g., drive signals, image signals, and/or power signals). In some embodiments, electrical traces 142 may form a conductive path between the inner platform 132 and the outer platform 134. This may be achieved, for example, by including electrical traces 142 on and/or in the flexure arm(s) 136. As indicated in FIG. 1D, a portion of the flexure arrangement (e.g., a portion of the outer platform 134) may extend from inside the camera 100 to one or more external components that are external to the camera 100 (e.g., one or more processors of a device in which the camera 100 is included), and the electrical traces 142 may be used convey electrical signals between the camera 100 and the external component(s).

According to various embodiments, the camera 100 may include an optical element 144 attached to the coil carrier 118, e.g., as indicated in FIG. 1A. The optical element 144 may allow at least a portion of the light that passes through the lens group 102 to reach the image sensor 104. The optical element 144 may be positioned along the optical axis 106, e.g., between the lens group 102 and the image sensor 104. In some examples, the optical element 144 may comprise an optical filter (e.g., an infrared cut-off filter (IRCF)). In various embodiments, the image sensor 104 may be entirely encapsulated within a chamber 146 defined by the substrate 110, the coil carrier 118, and the optical element 142, e.g., as indicated in FIG. 1A. The chamber may be a dust seal chamber that protects the image sensor 104 from dust and/or other debris that may undesirably impact image quality, camera performance, and/or user experience.

In some embodiments, the camera 100 may include one or more position sensors 148 and/or one or more other electrical components 150 mounted on the substrate 110. For example, as indicated in FIGS. 1A and 1D, the position sensor(s) 148 and/or the electrical component(s) 150 may be mounted on a bottom side of the substrate 110 that faces towards a bottom of the camera 100. Furthermore, the camera 100 may include one or more probe magnets 152 attached to an inner surface of a bottom cover 154 that at least partially encases a bottom portion of the camera 100, e.g., as indicated in FIG. 1A. The position sensor(s) 148 may be used to detect a position of the image sensor 104 in at least one direction parallel to the optical axis 106 (e.g., the Z-axis direction). For example, a position sensor 148 and a corresponding probe magnet 152 may be positioned proximate one another such that the position sensor 148 is capable of sensing changes in a magnetic field of the probe magnet 152 as the position sensor moves (together with the image sensor package) in the Z-axis direction, relative to the probe magnet 152. In some embodiments, the electrical component(s) 150 may include one or more drivers for providing a drive current to the coil(s) 114, e.g., via a conductive path that includes the substrate 110, the coil carrier 118, and/or the suspension arrangement(s). In some embodiments, the driver(s) may receive actuator command signals from one or more controllers (e.g., a controller inside the camera 100 and/or a controller that is external to the camera 100), which may be conveyed to the driver(s) via the flexure arrangement 124.

In some embodiments, the bottom cover 154 may at least partially encase a bottom of the camera 100 and one or more sides of the camera 100. As indicated in FIG. 1A, the yoke 116 may have a lower portion that is attached to the base structure 126, and the bottom cover 154 may have an upper portion that at least partially overlaps with the lower portion of the yoke 116, e.g., as generally indicated by dashed region 156 in FIG. 1A. As such, the yoke 116 and the bottom cover 154 may collectively form one or more sides of the camera 100 in some embodiments.

According to various embodiments, the lens barrel 108 may be fixedly attached to the yoke 116. For example, the lens barrel 108 may include a flange 158 that protrudes radially (e.g., with respect to the optical axis 106) outward, away from the lens group 102. An underside of the flange 158 may be fixedly attached (e.g., via an adhesive at bond line 160 in FIG. 1A) to a top surface of the yoke 116, e.g., as generally indicated by dashed region 162 in FIG. 1A. As such, in various non-limiting embodiments, the lens group 102 may be a fixed, stationary component of the camera 100.

As indicated in FIG. 1A, the coil carrier 118 may define an upper end stop 164 (e.g., with the yoke 116) and/or a lower end stop 166 (e.g., with the base structure 126). In some embodiments, the coil(s) 114 are at least partially embedded within a recess and/or pocket of the coil carrier 118. The coil carrier 118 may include a first portion that is attached to the substrate 110, a second portion that extends from the first portion towards the optical axis 106, and a third portion that extends from the first portion away from the optical axis. The optical element 144 may be attached to the second portion. The third portion may define the upper end stop 164, the lower end stop 166, and the recess (within which the coil 114 may be at least partially embedded). The recess may be positioned, in the Z-axis direction, between the upper end stop 164 and the lower end stop 166.

Figure 2:
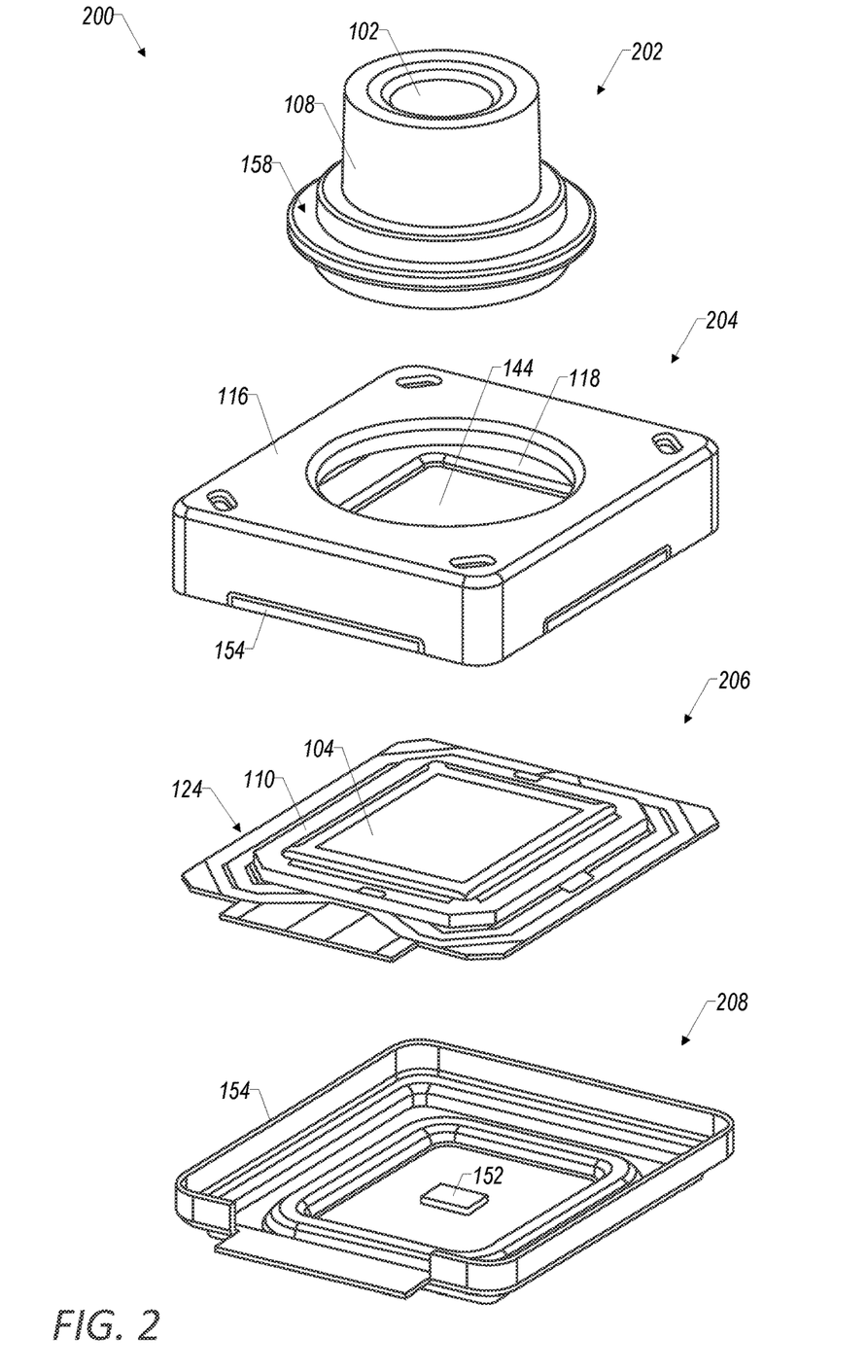
FIG. 2 illustrates a partially exploded view of an example camera having a sensor-shifting AF mechanism, in accordance with some embodiments.

FIG. 2 illustrates a partially exploded view of an example camera 200 having a sensor-shifting AF mechanism. In various embodiments, the camera 200 may include a lens assembly 202, a voice coil motor (VCM) actuator assembly 204, a substrate and flexure assembly 206, and/or a bottom cover 208 (e.g., bottom cover 154 in FIG. 1A). These assemblies may also be referred to herein as sub-assemblies (and/or modules) of an overall assembly of the camera 200. The lens assembly 202 may include, for example, the lens group 102 and the lens barrel 108 described herein with reference to FIGS. 1A-1D. The VCM actuator assembly 204 may include, for example, magnet(s) 112, the yoke 116, the coil(s) 114, the coil carrier 118, the optical element 144, the spring suspension arrangement 122, and/or the base structure 126 described herein with reference to FIGS. 1A-1D.

The substrate and flexure assembly 206 may include the image sensor 104, the substrate 110, and/or the flexure arrangement 124 described herein with reference to FIGS. 1A-1D.

In some embodiments, the VCM actuator assembly 204 and/or the substrate and flexure assembly 206 may be assembled at one or more locations and/or business entities (e.g., manufacturer, vendor, etc.) than that of a location and/or business entity for the overall assembly of the camera 200, which may include coupling the VCM actuator assembly 204 with the substrate and flexure assembly 206 (e.g., via glue bonding), coupling the lens assembly 202 with the VCM actuator assembly 204 (e.g., using an adhesive in an active alignment process), and attaching the bottom cover 208 to the base structure 154 and/or the yoke 116.

Figure 3A:
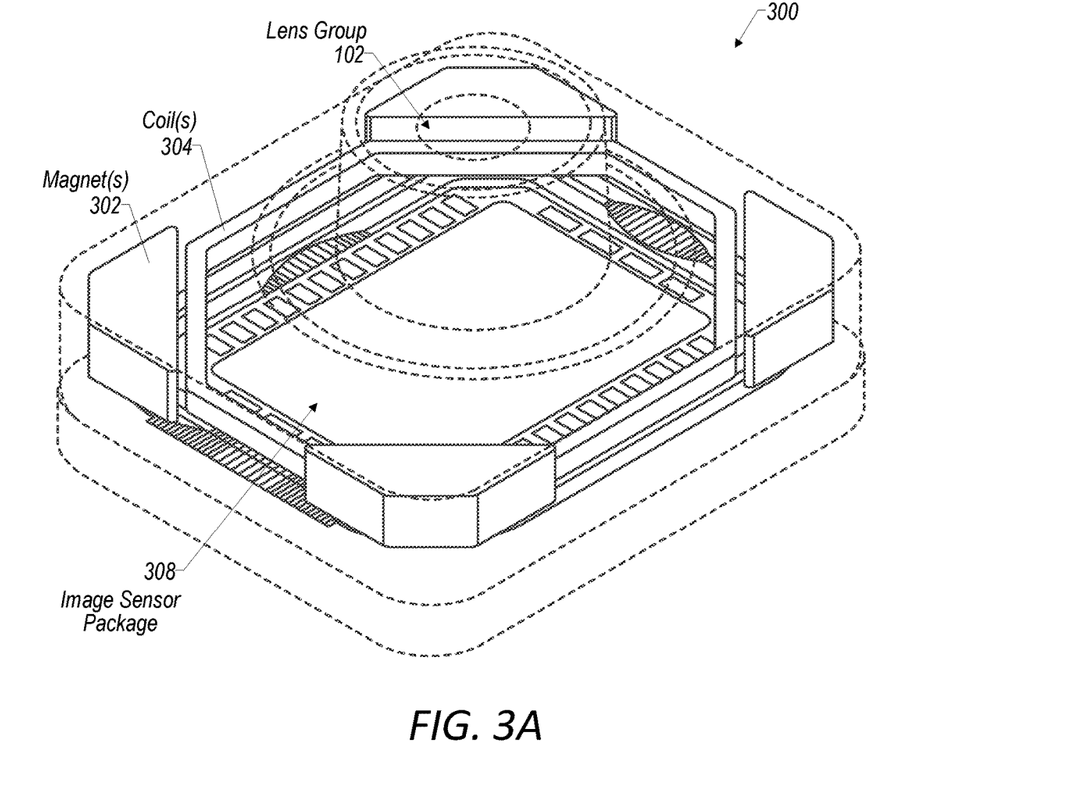
FIG. 3A shows a perspective view that includes the magnet-coil arrangement.
Figure 3B:
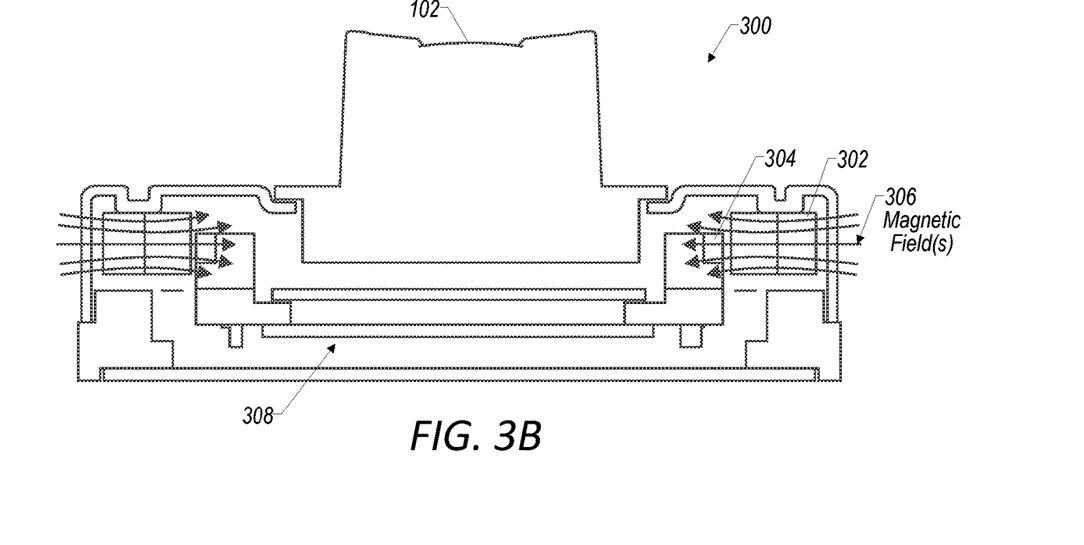
FIG. 3B shows a cross-sectional view that includes the magnet-coil arrangement.

FIGS. 3A-3B illustrate views of an example magnet-coil arrangement 300 of a voice coil motor (VCM) actuator that may be included in a camera having a sensor-shifting AF mechanism. FIG. 3A shows a perspective view that includes the magnet-coil arrangement 300. FIG. 3B shows a cross-sectional view that includes the magnet-coil arrangement 300. In various embodiments, the magnet-coil arrangement may include one or more magnets 302 (e.g., magnet(s) 112 in FIG. 1B) and one or more coils 304 (e.g., coil(s) 114 in FIGS. 1A-1B). In some embodiments, the magnet(s) 302 may comprise trapezoidal corner magnets, e.g., as indicated in FIG. 3A. Furthermore, the coil(s) 304 may comprise a coil with chamfered corner portions proximate respective corner magnets, e.g., as indicated in FIG. 3A, in some non-limiting embodiments.

FIG. 3B indicates example magnetic field lines 306 associated with magnetic field(s) of the magnet(s) 302. The coil(s) 304, when supplied with a drive current, may be driven to magnetically interact with the magnet(s) 302 to produce Lorentz forces that move the image sensor package 308.

Figure 4A:
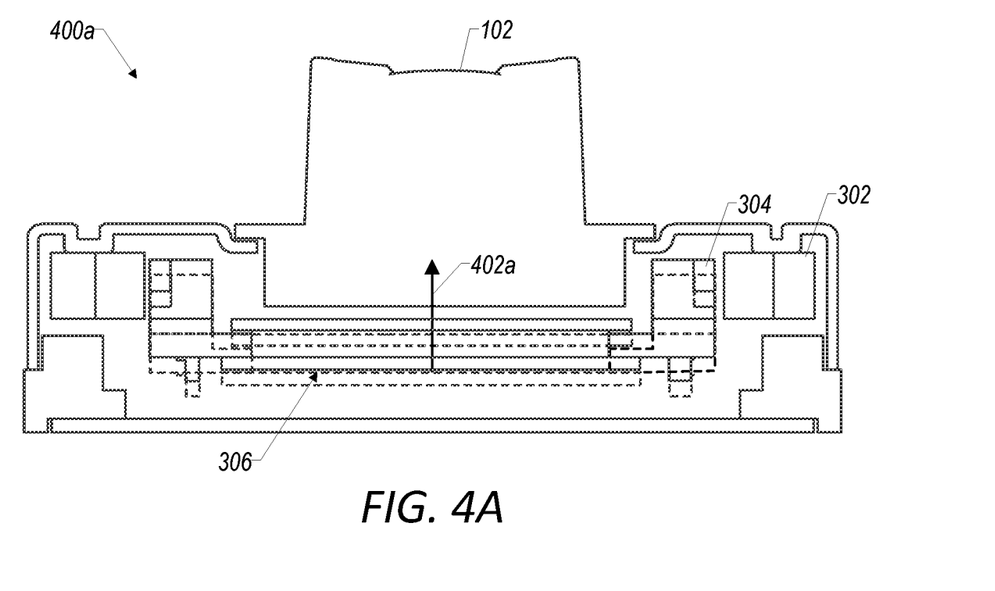
FIG. 4A shows an example of an upward AF stroke.
Figure 4B:
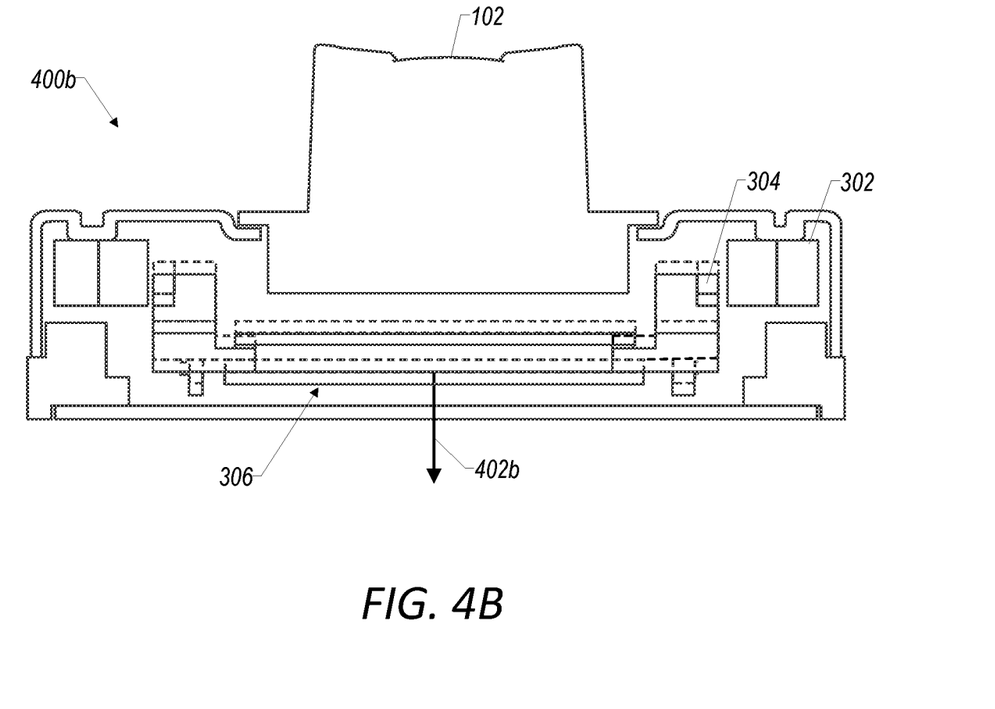
FIG. 4B shows an example of a downward AF stroke.

FIGS. 4A-4B illustrate examples of AF motion that may be implemented in a camera having a sensor-shifting AF mechanism, in accordance with some embodiments. FIG. 4A shows an example of an upward AF stroke, where the Lorentz forces discussed above generally have an upward direction, as indicated by arrow 402a. FIG. 4B shows an example of a downward AF stroke, where the Lorentz forces discussed above generally have a downward direction, as indicated by arrow 402b. The dashed lines in FIGS. 4A-4B indicate an initial position of certain components (e.g., including the image sensor package 306) that move in the AF strokes, and the corresponding solid lines indicate a subsequent position of those movable components resulting from the AF strokes.

Figure 5:
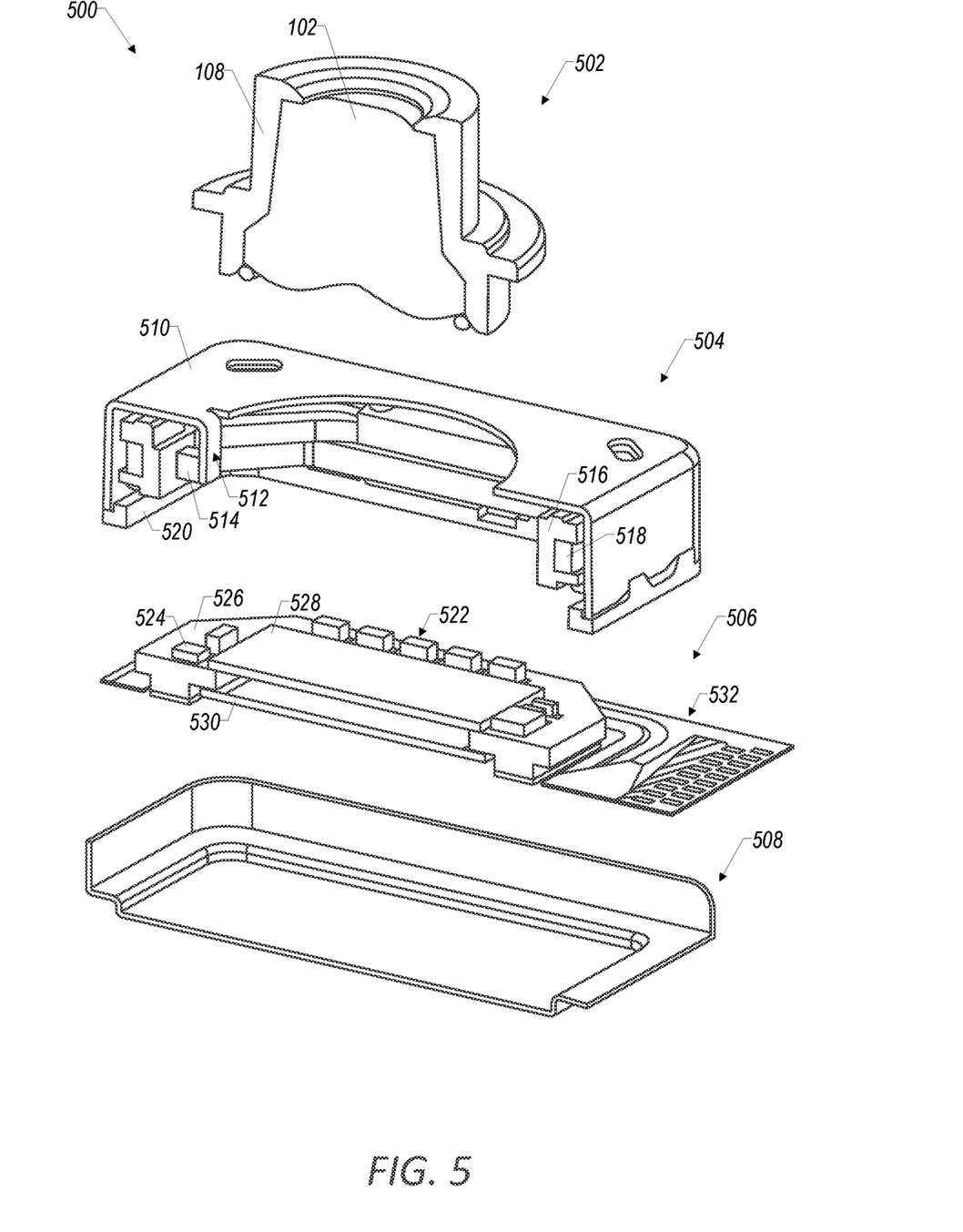
FIG. 5 illustrates a partially exploded cross-sectional view of an example camera having a sensor-shifting AF mechanism, where the camera includes electrical components mounted on a top side of a ceramic substrate, in accordance with some embodiments.

FIG. 5 illustrates a partially exploded cross-sectional view of an example camera 500 having a sensor-shifting AF mechanism, where the camera 500 includes electrical components mounted on a top side of a ceramic substrate. In various embodiments, the camera 500 may include a lens assembly 502, a voice coil motor (VCM) actuator assembly 504, a substrate and flexure assembly 506, and/or a bottom cover 508. These assemblies may also be referred to herein as sub-assemblies (and/or modules) of an overall assembly of the camera 500. The lens assembly 502 may include, for example, the lens group 102 and the lens barrel 108 described herein with reference to FIGS. 1A-1D.

In some embodiments, the VCM actuator assembly 504 may include a yoke 510 with a protrusion 512 that extends downwards from a top of the yoke 510. A probe magnet 514 (e.g., for position sensing) may be attached to the yoke 510. For example, the probe magnet 514 may be attached to the protrusion 512, such that the probe magnet 514 is positioned beside an inner surface of the coil carrier 516 (to which coil 518 may be attached). A base structure 520 may be attached to a bottom portion of the yoke 510.

In some embodiments, the substrate and flexure assembly 506 may include electrical components 522, including a position sensor 524, mounted on a top side of the ceramic substrate 526. The position sensor 524 may be positioned below the probe magnet 514, so as to detect changes in the magnetic field of the probe magnet 514 as the position sensor 524 moves relative to the probe magnet 514. Furthermore, an optical element 528 (e.g., an optical filter such as an IRCF) may be attached to the top side of the ceramic substrate 526. The image sensor 530 may be attached to the ceramic substrate 526 at a position below the optical element 528, e.g., in a flip chip configuration. Furthermore, the substrate and flexure assembly 506 may include a flexure arrangement 532 (e.g., flexure arrangement 124 in FIGS. 1A-1D) attached to a bottom side of the ceramic substrate 526.

Figure 6:
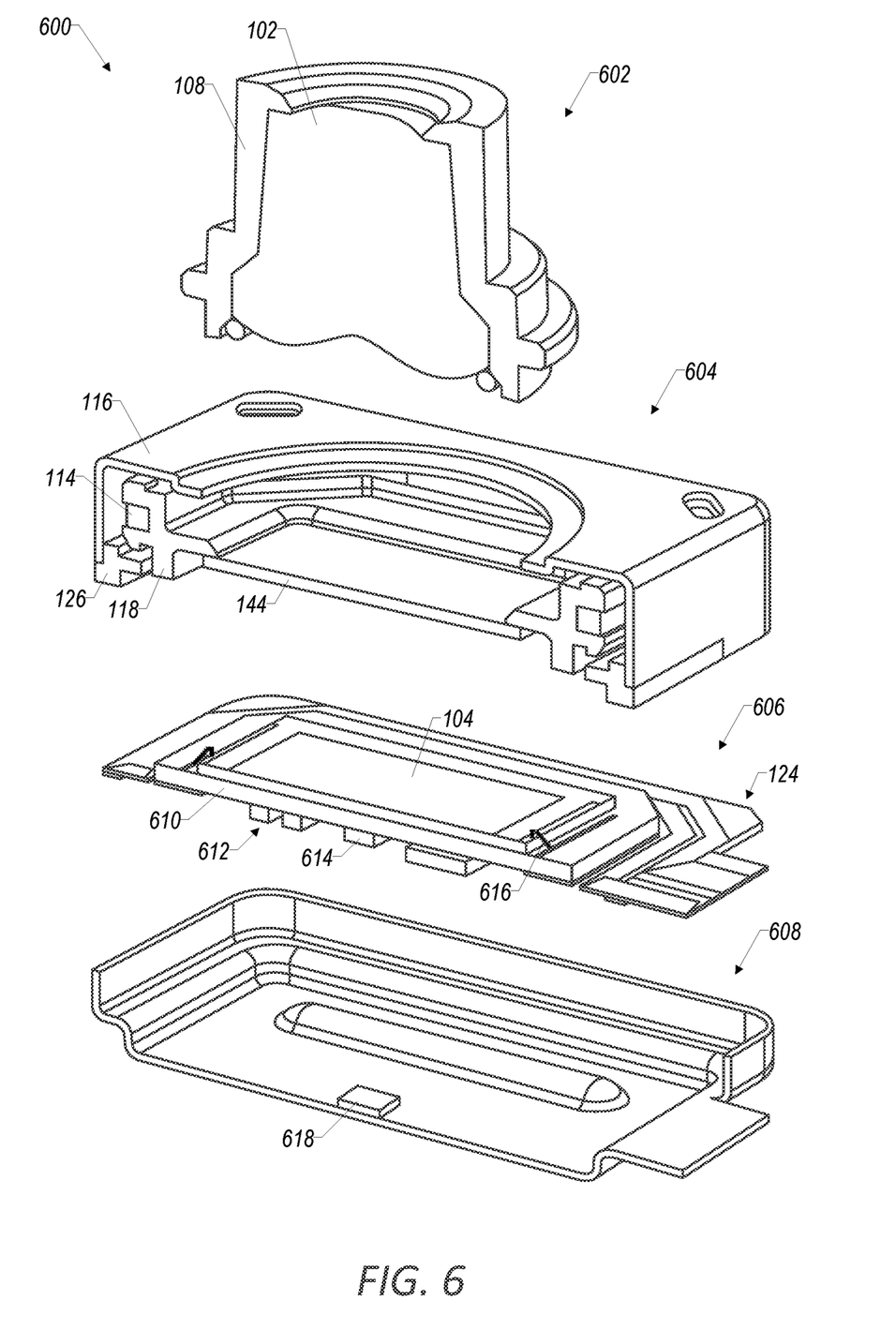
FIG. 6 illustrates a partially exploded cross-sectional view of another example camera having a sensor-shifting AF mechanism, where the camera includes electrical components mounted on a bottom side of an organic substrate, in accordance with some embodiments.

FIG. 6 illustrates a partially exploded cross-sectional view of another example camera 600 having a sensor-shifting AF mechanism, where the camera includes electrical components mounted on a bottom side of an organic substrate. In various embodiments, the camera 600 may include a lens assembly 602, a voice coil motor (VCM) actuator assembly 604, a substrate and flexure assembly 606, and/or a bottom cover 608. These assemblies may also be referred to herein as sub-assemblies (and/or modules) of an overall assembly of the camera 600. The lens assembly 602 may include, for example, the lens group 102 and the lens barrel 108 described herein with reference to FIGS. 1A-1D.

The VCM actuator assembly 604 may include, for example, magnet(s) 112, the yoke 116, the coil(s) 114, the coil carrier 118, the optical element 144, the spring suspension arrangement 122, and/or the base structure 126 described herein with reference to FIGS. 1A-1D. The substrate and flexure assembly 606 may include the image sensor 104 and the flexure arrangement 124 described herein with reference to FIGS. 1A-1D, and the organic substrate 610. Furthermore, the substrate and flexure assembly 606 may include electrical components 612, including a position sensor 614, mounted on a bottom side of the organic substrate 610. The image sensor 104 may be attached to a top side of the organic substrate 610, e.g., in a wire bond configuration using wires 616. A probe magnet 618 may be attached to an inner surface of the bottom cover 608. The probe magnet 618 may be positioned below the position sensor 614, such that the position sensor 614 is capable of detecting changes in the magnetic field of the probe magnet 618 as the position sensor 614 moves relative to the probe magnet 618.

Figure 7:
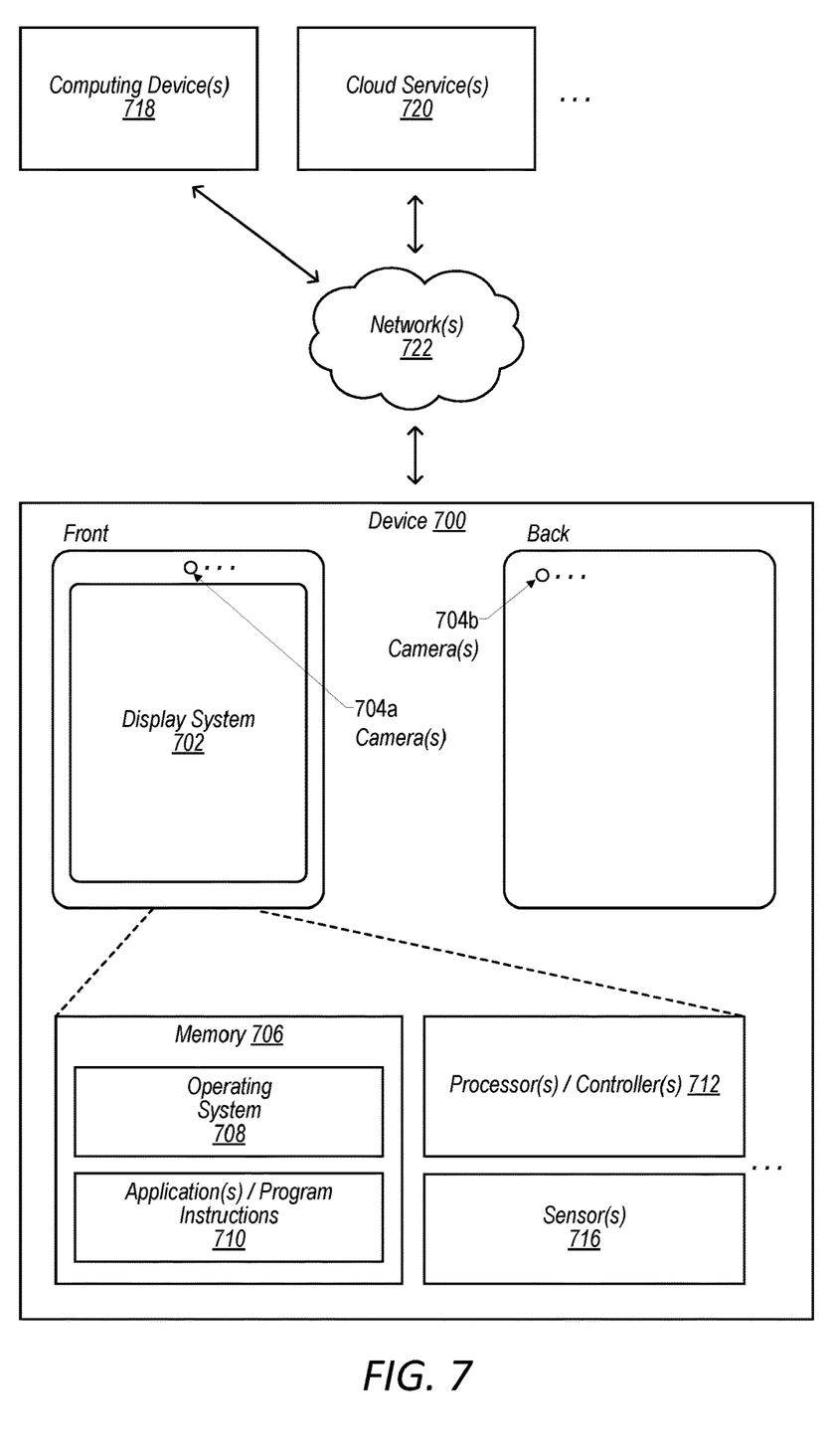
FIG. 7 illustrates a schematic representation of an example device that may include a camera having a sensor-shifting AF mechanism, in accordance with some embodiments.

FIG. 7 illustrates a schematic representation of an example device 700 that may include a camera (e.g., camera 100 in FIGS. 1A-1D, camera 200 in FIG. 2, camera 500 in FIG. 5, camera 600 in FIG. 6, etc.) having sensor-shifting AF mechanism, in accordance with some embodiments. In some embodiments, the device 700 may be a mobile device and/or a multifunction device. In various embodiments, the device 700 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In some embodiments, the device 700 may include a display system 702 (e.g., comprising a display and/or a touch-sensitive surface) and/or one or more cameras 704. In some non-limiting embodiments, the display system 702 and/or one or more front-facing cameras 704a may be provided at a front side of the device 700, e.g., as indicated in FIG. 7. Additionally, or alternatively, one or more rear-facing cameras 704b may be provided at a rear side of the device 700. In some embodiments comprising multiple cameras 704, some or all of the cameras may be the same as, or similar to, each other. Additionally, or alternatively, some or all of the cameras may be different from each other. In various embodiments, the location(s) and/or arrangement(s) of the camera(s) 704 may be different than those indicated in FIG. 7.

Among other things, the device 700 may include memory 706 (e.g., comprising an operating system 708 and/or application(s)/program instructions 710), one or more processors and/or controllers 712 (e.g., comprising CPU(s), memory controller(s), display controller(s), and/or camera controller(s), etc.), and/or one or more sensors 716 (e.g., orientation sensor(s), proximity sensor(s), and/or position sensor(s), etc.). In some embodiments, the device 700 may communicate with one or more other devices and/or services, such as computing device(s) 718, cloud service(s) 720, etc., via one or more networks 722. For example, the device 700 may include a network interface (e.g., network interface 710) that enables the device 700 to transmit data to, and receive data from, the network(s) 722. Additionally, or alternatively, the device 700 may be capable of communicating with other devices via wireless communication using any of a variety of communications standards, protocols, and/or technologies.

Figure 8:
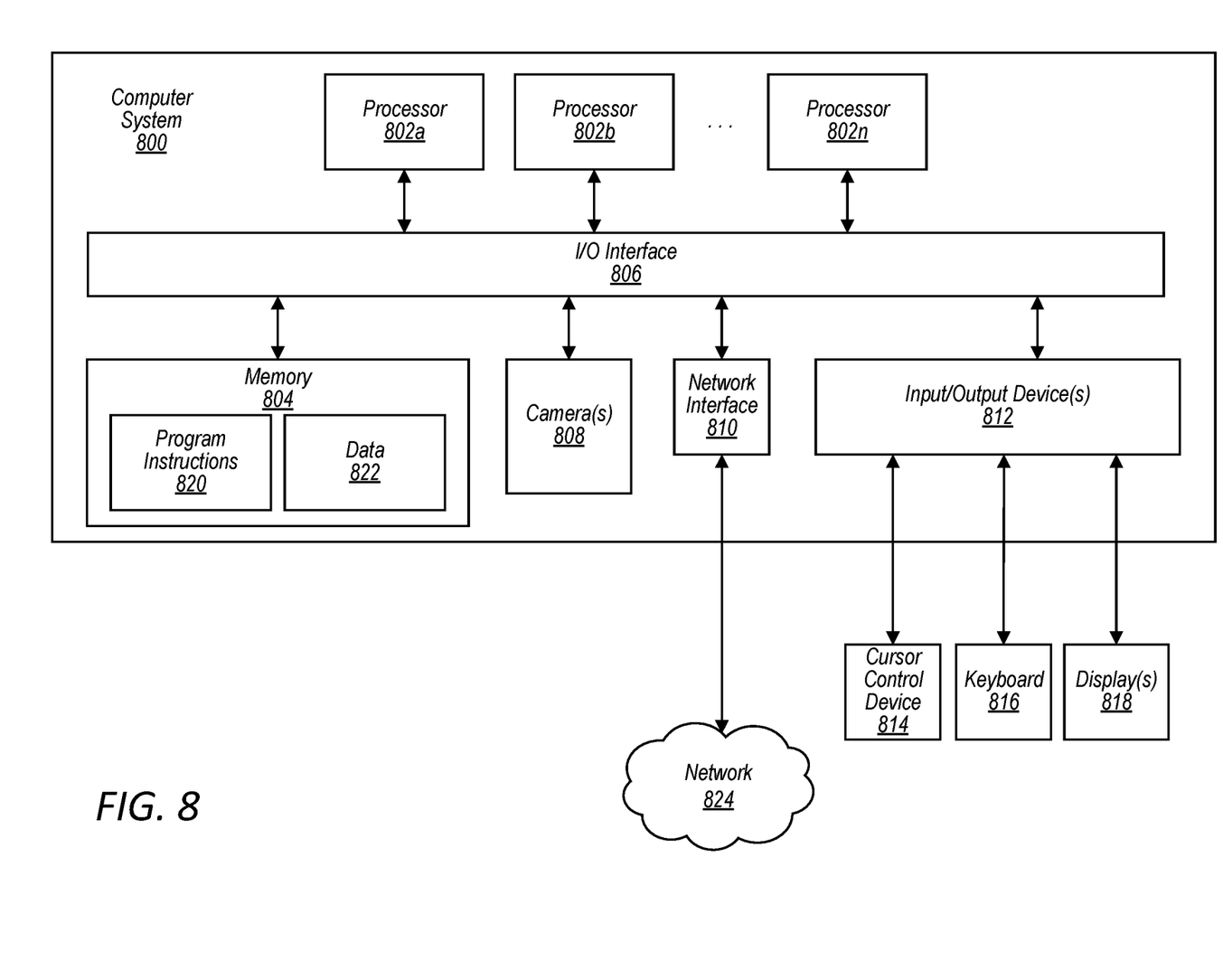
FIG. 8 illustrates a schematic block diagram of an example computer system that may include a camera having a sensor-shifting AF mechanism, in accordance with some embodiments.

FIG. 8 illustrates a schematic block diagram of an example computing device, referred to as computer system 800, that may include or host embodiments of a camera (e.g., camera 100 in FIGS. 1A-1D, camera 200 in FIG. 2, camera 500 in FIG. 5, camera 600 in FIG. 6, etc.) having sensor-shifting AF mechanism, e.g., as described herein with reference to FIGS. 1A-7. In addition, computer system 800 may implement methods for controlling operations of the camera and/or for performing image processing images captured with the camera. In some embodiments, the device 700 (described herein with reference to FIG. 7) may additionally, or alternatively, include some or all of the functional components of the computer system 800 described herein.

The computer system 800 may be configured to execute any or all of the embodiments described above. In different embodiments, computer system 800 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In the illustrated embodiment, computer system 800 includes one or more processors 802 coupled to a system memory 804 via an input/output (I/O) interface 806. Computer system 800 further includes one or more cameras 808 coupled to the I/O interface 806. Computer system 800 further includes a network interface 810 coupled to I/O interface 806, and one or more input/output devices 812, such as cursor control device 814, keyboard 816, and display(s) 818. In some cases, it is contemplated that embodiments may be implemented using a single instance of computer system 800, while in other embodiments multiple such systems, or multiple nodes making up computer system 800, may be configured to host different portions or instances of embodiments. For example, in one embodiment some elements may be implemented via one or more nodes of computer system 800 that are distinct from those nodes implementing other elements.

In various embodiments, computer system 800 may be a uniprocessor system including one processor 802, or a multiprocessor system including several processors 802 (e.g., two, four, eight, or another suitable number). Processors 802 may be any suitable processor capable of executing instructions. For example, in various embodiments processors 802 may be general-purpose or embedded processors implementing any of a variety of instruction set architectures (ISAs), such as the x86, PowerPC, SPARC, or MIPS ISAs, or any other suitable ISA. In multiprocessor systems, each of processors 802 may commonly, but not necessarily, implement the same ISA.

System memory 804 may be configured to store program instructions 820 accessible by processor 802. In various embodiments, system memory 804 may be implemented using any suitable memory technology, such as static random access memory (SRAM), synchronous dynamic RAM (SDRAM), nonvolatile/Flash-type memory, or any other type of memory. Additionally, existing camera control data 822 of memory 804 may include any of the information or data structures described above. In some embodiments, program instructions 820 and/or data 822 may be received, sent or stored upon different types of computer-accessible media or on similar media separate from system memory 804 or computer system 800. In various embodiments, some or all of the functionality described herein may be implemented via such a computer system 800.

In one embodiment, I/O interface 806 may be configured to coordinate I/O traffic between processor 802, system memory 804, and any peripheral devices in the device, including network interface 810 or other peripheral interfaces, such as input/output devices 812. In some embodiments, I/O interface 806 may perform any necessary protocol, timing or other data transformations to convert data signals from one component (e.g., system memory 804) into a format suitable for use by another component (e.g., processor 802). In some embodiments, I/O interface 806 may include support for devices attached through various types of peripheral buses, such as a variant of the Peripheral Component Interconnect (PCI) bus standard or the Universal Serial Bus (USB) standard, for example. In some embodiments, the function of I/O interface 806 may be split into two or more separate components, such as a north bridge and a south bridge, for example. Also, in some embodiments some or all of the functionality of I/O interface 806, such as an interface to system memory 804, may be incorporated directly into processor 802.

Network interface 810 may be configured to allow data to be exchanged between computer system 800 and other devices attached to a network 824 (e.g., carrier or agent devices) or between nodes of computer system 800. Network 824 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 810 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 812 may, in some embodiments, include one or more display terminals, keyboards, keypads, touchpads, scanning devices, voice or optical recognition devices, or any other devices suitable for entering or accessing data by one or more computer systems 800. Multiple input/output devices 812 may be present in computer system 800 or may be distributed on various nodes of computer system 800. In some embodiments, similar input/output devices may be separate from computer system 800 and may interact with one or more nodes of computer system 800 through a wired or wireless connection, such as over network interface 810.

Those skilled in the art will appreciate that computer system 800 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 800 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 800 may be transmitted to computer system 800 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A camera, comprising:
    a lens group comprising one or more lens elements that define an optical axis;
    an image sensor package, comprising:
        an image sensor to capture image data based on light that passes through the lens group; and
        a substrate to which the image sensor is attached;
    a coil carrier fixedly coupled with the image sensor package, such that the image sensor package is movable together with the coil carrier; and
    a voice coil motor (VCM) actuator to move the image sensor in at least one direction parallel to the optical axis, the VCM actuator comprising:
        one or more magnets attached to a stationary structure of the camera; and
        one or more coils fixedly coupled with the coil carrier and positioned proximate the one or more magnets between the one or more magnets and the optical axis, such that the one or more coils are capable of electromagnetically interacting with the one or more magnets to produce Lorentz forces that move the image sensor in the direction parallel to the optical axis.

2. The camera of claim 1, further comprising:
    an optical element attached to the coil carrier and positioned along the optical axis, wherein the optical element allows at least a portion of the light that passes through the lens group to reach the image sensor;
    wherein the image sensor is entirely encapsulated within a chamber defined by the substrate, the coil carrier, and the optical element.

3. The camera of claim 1, further comprising:
    a suspension arrangement to suspend the coil carrier from at least one of:
        the one or more magnets; or
        a base structure of the camera, wherein the base structure is positioned below the one or more magnets;
    wherein the suspension arrangement is configured to allow motion of the coil carrier enabled by the VCM actuator.

4. The camera of claim 3, wherein the suspension arrangement comprises at least one of:
an upper leaf spring that is attached to the coil carrier and to the one or more magnets; or
a lower leaf spring that is attached to the coil carrier and to the base structure.

5. The camera of claim 3, further comprising:
a flexure arrangement, comprising:
an inner platform attached to the substrate;
an outer platform attached to the base structure;
one or more flexure arms attached to the inner platform and to the outer platform; and
one or more electrical traces on the one or more flexure arms for routing electrical signals between the inner platform and the outer platform.

6. The camera of claim 1, wherein the VCM actuator is controllable to provide autofocus (AF) of an image on the image sensor.

7. The camera of claim 1, wherein:
the stationary structure comprises:
a yoke that at least partially encases the coil carrier;
the camera further comprises:
a lens barrel to which the lens group is fixedly attached; and
the lens barrel is fixedly attached to the yoke.

8. The camera of claim 1, further comprising:
a position sensor to detect a position of the image sensor in the at least one direction parallel to the optical axis, wherein the position sensor is fixedly attached to a bottom side of the substrate that faces towards a bottom of the camera; and
a probe magnet fixedly attached to an inner surface of a bottom cover of the camera, wherein the probe magnet is positioned proximate the position sensor such that the position sensor is capable of sensing changes of a magnetic field of the probe magnet as the image sensor moves in the at least one direction.

9. The camera of claim 1, wherein:
the stationary structure comprises a yoke that at least partially encases the coil carrier; and
the camera further comprises:
a position sensor to detect a position of the image sensor in the at least one direction parallel to the optical axis, wherein the position sensor is fixedly attached to a top side of the substrate that faces towards a top of the camera; and
a probe magnet fixedly attached to the yoke, wherein the probe magnet is positioned proximate the position sensor such that the position sensor is capable of sensing changes of a magnetic field of the probe magnet as the image sensor moves in the at least one direction.

10. A device, comprising:
one or more processors;
memory storing program instructions executable by the one or more processors to control operations of a camera; and
the camera, comprising:
a lens group comprising one or more lens elements that define an optical axis;
an image sensor package, comprising:
an image sensor to capture image data based on light that passes through the lens group; and
a substrate to which the image sensor is attached;
a coil carrier fixedly coupled with the image sensor package, such that the image sensor package is movable together with the coil carrier;
an optical element attached to the coil carrier and positioned along the optical axis, wherein the image sensor is entirely encapsulated within a chamber defined by the substrate, the coil carrier, and the optical element; and
a voice coil motor (VCM) actuator to move the image sensor in at least one direction parallel to the optical axis, the VCM actuator comprising:
one or more magnets attached to a stationary structure of the camera; and
one or more coils fixedly coupled with the coil carrier and positioned proximate the one or more magnets such that the one or more coils are capable of electromagnetically interacting with the one or more magnets to produce Lorentz forces that move the image sensor in a direction parallel to the optical axis.

11. The device of claim 10, wherein the optical element comprises:
an optical filter.

12. The device of claim 10, wherein the camera further comprises:
a base structure that at least partially encircles the substrate;
a suspension arrangement to suspend the coil carrier from:
the one or more magnets; and
the base structure;
wherein the suspension arrangement is configured to allow motion of the coil carrier enabled by the VCM actuator.

13. The device of claim 12, wherein the suspension arrangement comprises:
an upper leaf spring that is attached to the coil carrier and to the one or more magnets; and
a lower leaf spring that is attached to the coil carrier and to the base structure.

14. The device of claim 12, wherein the camera further comprises:
a flexure arrangement, comprising:
an inner platform attached to the substrate;
an outer platform attached to the base structure;
one or more flexure arms attached to the inner platform and to the outer platform; and
one or more electrical traces on the one or more flexure arms for routing electrical signals between the inner platform and the outer platform.

15. The device of claim 10, wherein the one or more processors are configured to control the VCM actuator to provide autofocus (AF) of an image on the image sensor.

16. The device of claim 10, wherein:
the stationary structure comprises:
a yoke that at least partially encases the coil carrier;
the camera further comprises:
a lens barrel to which the lens group is fixedly attached; and
the lens barrel is fixedly attached to the yoke.

17. The device of claim 16, wherein the one or more magnets comprise corner magnets mounted at corners of the yoke.

18. The device of claim 10, wherein:
the image sensor package further comprises:
one or more electrical components on the substrate.

19. The device of claim 10, wherein:
the substrate comprises an organic substrate;
the image sensor package further comprises:
one or more electrical components on a bottom side of the organic substrate; and the image sensor is connected to the organic substrate in wire bond configuration.

20. A voice coil motor (VCM) actuator module, comprising:
- a coil carrier to fixedly couple with an image sensor substrate of a camera, wherein the coil carrier defines an opening configured to allow light to pass from a lens group of the camera, along an optical axis defined by the lens group, to an image sensor attached to the image sensor substrate;
- one or more coils attached to the coil carrier;
- a yoke that at least partially encases the coil carrier;
- one or more magnets attached to the yoke, wherein the VCM actuator module is configured such that the one or more coils are to be positioned between the one or more magnets and the optical axis and are capable of electromagnetically interacting with the one or more magnets to produce Lorentz forces that move the coil carrier, relative to the yoke, in at least one direction parallel to the optical axis; and
- a suspension arrangement that suspends the coil carrier from one or more stationary components of the VCM actuator module and that allows motion of the coil carrier in the at least one direction.

\* \* \* \* \*